Patented Feb. 14, 1939

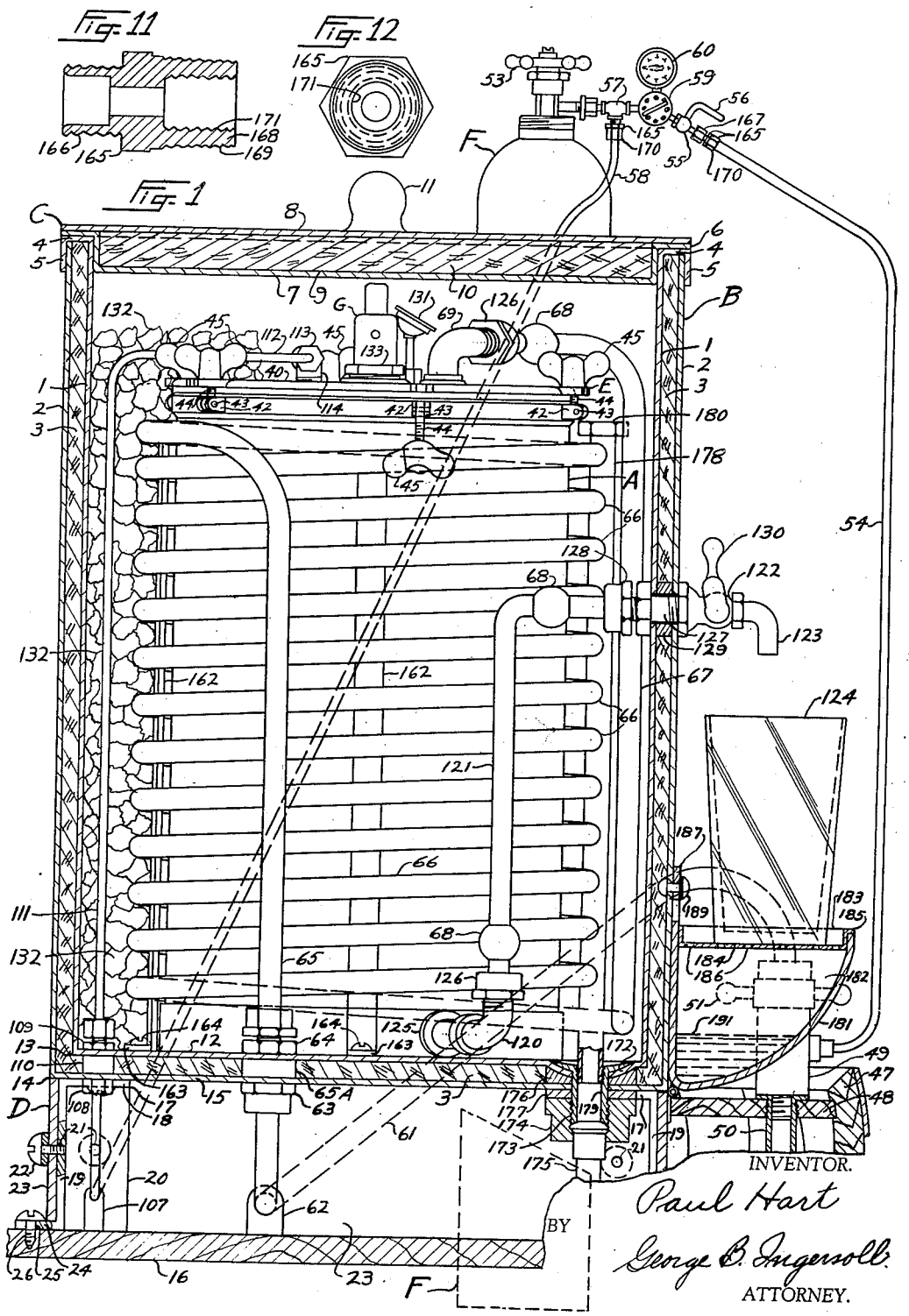

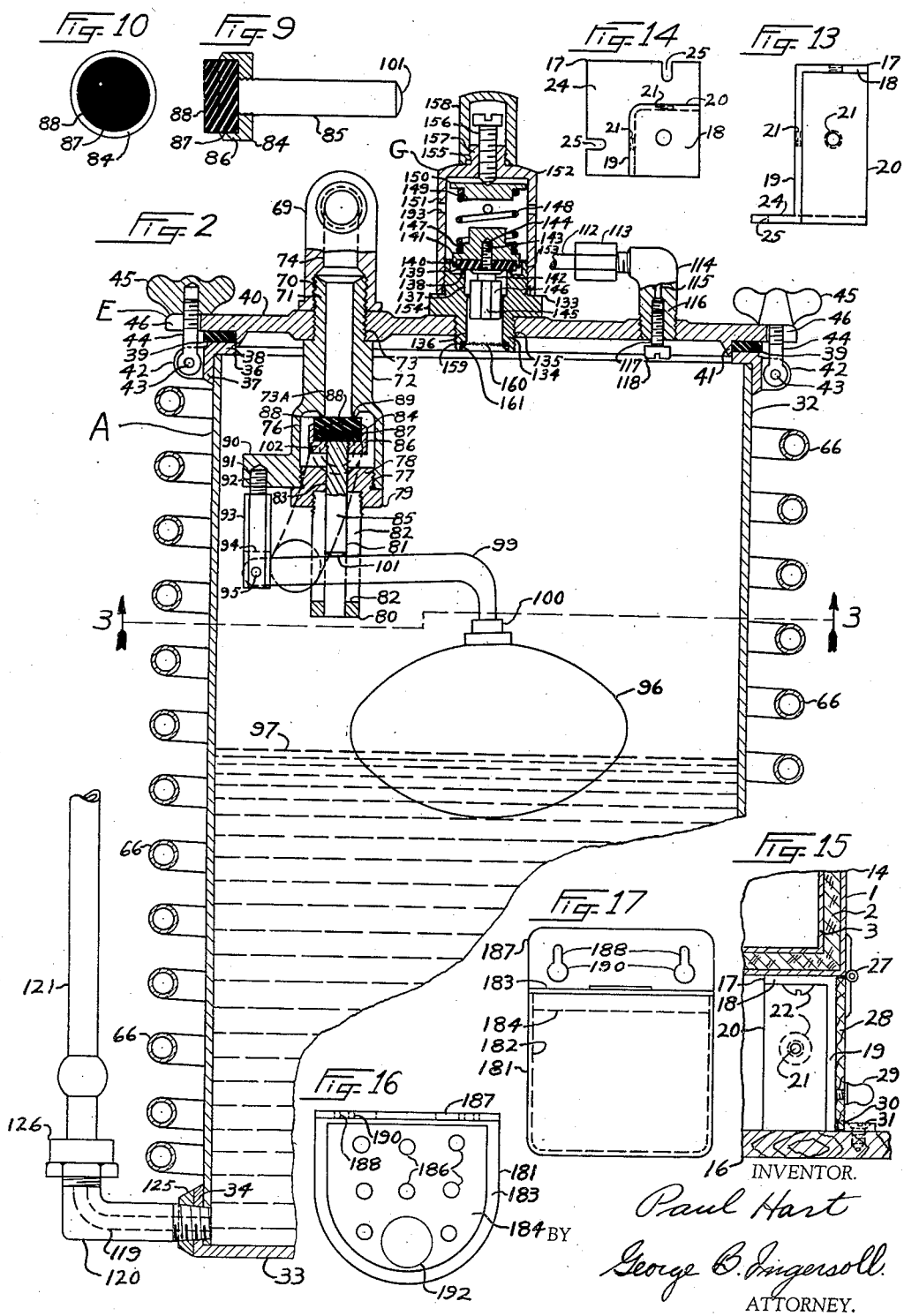

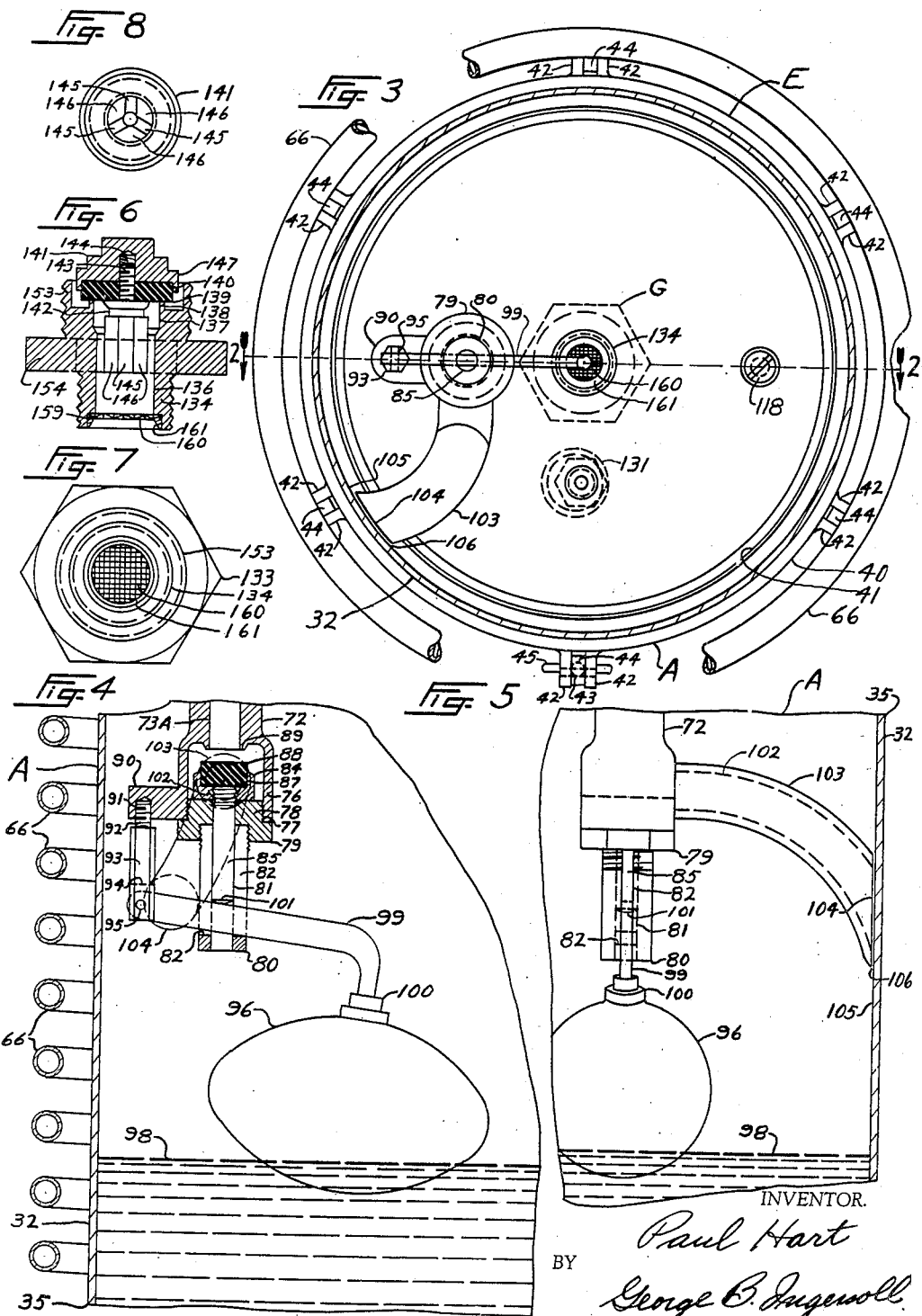

2,147,252

UNITED STATES PATENT OFFICE 2,147,252

DISPENSING MECHANISM

Paul Hart, Detroit, Mich.

Application June 7, 1935, Serial No. 25,366

10 Claims. (Cl. 225—9)

My invention relates to improvements in dispensing mechanisms in which a liquid is dispensed under pressure and the objects of my improvements are, first, to provide a dispensing mechanism adapted to dispense a liquid under pressure without the creation of excessive amounts of foam in the dispensed liquid; second, to provide a dispensing mechanism for dispensing the liquid and in which the liquid is guided into the dispensing mechanism in a manner to prevent the liquid from developing excessive foam or effervescence within the dispensing mechanism; third, to provide a dispensing mechanism for dispensing liquid under pressure and in which a pressure is maintained on the surface of the liquid being dispensed; fourth, to provide a mechanism for dispensing liquid under pressure and provided with means for maintaining the pressure at a predetermined amount; fifth, to provide a dispensing mechanism for dispensing liquid under pressure and provided with a safety device to eliminate injury from excessive pressures within the dispensing mechanism; sixth, to provide a dispensing mechanism having a float mechanism adapted to control the entrance of the liquid within the dispensing mechanism; seventh, to provide a dispensing mechanism having a removable bracket or housing secured thereon for supporting the glass or utensil into which the liquid is dispensed; eighth, to provide a dispensing mechanism with a receptacle or housing member for supporting the utensil into which the liquid is dispensed and adapted for retaining any surplus liquid which is dispensed into said receptacle; ninth, to provide a dispensing mechanism that will maintain the liquid being dispensed in a predetermined and proper state of effervescence to prevent the liquid from becoming flat or tasteless; tenth, to provide a dispensing mechanism having a base assembly adapted to receive the conduit mechanism for connecting the dispensing mechanism with a source of supply of liquid being dispensed together with a source of gas under pressure; eleventh, to provide a dispensing mechanism having a base assembly provided with a hinged door member for providing ready access to the interior of the base mechanism; twelfth, to provide a dispensing mechanism having a container, containing the liquid to be dispensed, together with mechanism for controlling the flow of the liquid, with cooling mechanism disposed therearound; thirteenth, to provide a receptacle assembly for containing liquid with a drain mechanism that can be readily operated from the upper portion of the receptacle assembly; fourteenth, to provide a dispensing mechanism for a liquid provided with an inlet member located with a relatively narrow space between the end surface of the inlet member and the inside surface of a receptacle for containing the liquid; and fifteenth, to provide a dispensing mechanism provided with a valve mechanism having a resilient valve seat member.

I attain these objects by the mechanism illustrated in the accompanying drawings in which:

Figure 1 is a vertical section through the dispensing mechanism, said dispensing mechanism being disclosed as being connected with a source of gas pressure, together with the receptacle for containing the liquid to be dispensed, said dispensing mechanism being further disclosed as being contained with a cooling mechanism; Fig. 2, a vertical sectional view of the dispensing mechanism removed from its cooling mechanism or unit, said sectional view being taken on the line 2—2, Fig. 3, said Fig. 2 disclosing the float mechanism in its position for closing the inlet valve to the dispensing mechanism; Fig. 3, a sectional view of the dispensing mechanism as disclosed in Fig. 2, said sectional view being taken on the line 3—3, Fig. 2; Fig. 4, a partial sectional view of the dispensing mechanism taken on the line 2—2, Fig. 3 and disclosing the float mechanism in its position for opening the inlet valve to the dispensing mechanism; Fig. 5, a partial view of the dispensing mechanism disclosing a side view of the float mechanism disclosed in Fig. 4; Fig. 6, a sectional view of the safety valve mechanism, said sectional view being taken on the line 2—2, Fig. 3; Fig. 7, a top view of the safety valve mechanism disclosed in Fig. 6 without the valve mechanism assembly; Fig. 8, a bottom view of the safety valve mechanism disclosing the screen as being removed therefrom; Fig. 9, a partial sectional view of the inlet valve of the dispensing mechanism; Fig. 10, an end view of the inlet valve disclosed in Fig. 9; Fig. 11, a sectional view of a connection member; Fig 12, an end view of the connection member disclosed in Fig 11; Fig 13, a side view of one of the corner brackets of the base assembly for supporting the dispensing mechanism; Fig. 14, a plan view of the corner bracket member disclosed in Fig. 13; Fig. 15, a vertical sectional view through the hinged door or side wall portion of the base assembly; Fig. 16, a plan view of the removable bracket or housing member for supporting the glass or utensil into which the liquid is dispensed and Fig. 17, a side view of the bracket or housing member disclosed in Fig. 16.

Similar numerals refer to similar parts throughout the several views.

The container or receptacle assembly A is assembled and mounted within the receptacle or container assembly B, the receptacle or container assembly B being provided with the inner and outer walls 1 and 2 between which is retained the insulation 3 which may be formed of cork, felt or similar insulation material suitable for providing refrigerating characteristics. The inner wall 1 is provided with the flange portion 4 which is formed to extend over and close the space and retain the insulation material 3 between the inner and outer walls 1 and 2 at the upper end of the receptacle assembly B.

The flange 4 is further extended to form the flange 5 which extends peripherally around the upper end of the outer wall 2, thus retaining the inner and outer walls 1 and 2, together with the insulation material 3, in their assembled positions as a unit.

The upper end of the receptacle assembly B is closed by the cover assembly C which is provided with the inner wall member 6 which contacts the upper surface of the flange portion 4 of the inner wall 1, the wall portion 6 being provided with the displaced portion 7 which extends and pilots within the inside surface or bore of the inner wall member 1.

The cover assembly C is further provided with the wall portion 8 which extends across the upper end of the cover assembly C and closes the chamber 9 in the displaced portion 7 of the wall member 6, the wall portion 8 being suitably secured to the wall portion 6 at its peripheral edges as by welding, soldering or similar means. The chamber 9 may be filled with insulation material 10 similar to the insulation material 3.

The handle member 11 is suitably secured to the wall portion 8 of the cover assembly C and provides means for removing and replacing the cover assembly C on and in the receptacle assembly B. The inner wall portion 1 of the receptacle assembly B is further extended to form the bottom wall portion 12 which, together with the inner wall portion 1, forms a can or inner container member 13 which is thus spaced and positioned from an outer can or container member 14, the bottom wall portion 15 of which is formed by extending the outer wall portion 2, the bottom wall portion 12 of the can member 13 being spaced from the bottom wall portion 15 of the can member 14 by portions of the insulation 3.

The receptacle assembly B is mounted upon the base or support assembly D which in turn is mounted upon a table, bench, or similar supporting unit 16 which may be spaced and located above the floor line of a building or construction in which my dispensing mechanism is used.

The bracket members 17 are located at the corners of the receptacle assembly B when the receptacle assembly B is provided with a rectangular or similar polygonal shape and it is to be understood that the receptacle assembly B may be provided, if desired, with a cylindrical shape in which case the brackets 17 would be modified slightly in shape and be located as desired around the peripheral and lower portion of the receptacle assembly B, the receptacle assembly B being herein disclosed as having a rectangular or similar shape with the corner brackets 17 located at and under the corners thereof.

The corner brackets 17 are each provided with the upper flange 18 extending in a horizontal plane and on which the lower wall portion 15 of the can or container member 14 rests. The corner brackets 17 are also each provided with the vertical flange portions 19 and 20 and may be provided with the threaded holes 21 which are engaged by the screws 22 for securing the side wall members 23 to the corner brackets 17, the side wall members 23 forming an enclosure around the base assembly D and being positioned in alignment with the outer surfaces of the can member 14, the corner brackets 17 being each further provided with a flange portion 24 for resting on the upper surface of the table 16, the flange portions 24 being provided with the notches or slots 25 through which extend the screws 26 which thus secure the base assembly D to the table member 16.

It is to be noted that one of the side wall portions of the base assembly D is secured to a portion of the hinge 27 as disclosed in Fig. 15, one portion of the hinge 27 being further secured to the outer can member 14 to permit the door 28, which thus forms one of the wall portions of the base assembly D, to be swung outwardly by means of the handle member 29 which is secured thereto, to provide ready access to the interior of the base assembly D, the door member 28 being suitably notched as at 30 to clear the flange portions 24 of the corner brackets 17, the flange portions 24 adjacent the door member 28 being secured adjacent the door member 28 by the countersunk screws 31 to eliminate interference with the heads of the screws 31 and the door member 28 as it is swung outwardly to its open position.

The inner receptacle assembly A comprises the cylindrical wall member 32 which is closed at its lower end by the end or bottom member 33 having the upwardly extending flange portion 34 which is suitably secured as by soldering, welding, or similar means, to the lower end of the cylindrical wall portion 32, the end member 33, together with the cylindrical wall portion 32 forming the can or container member 35 having an open upper end adapted to be closed by the cover assembly E.

The can or container member 35 is reinforced at its upper ends by the end member 36 which is provided with the flange portion 37 which extends over the upper end of the cylindrical member 32 and to which the flange portion 37 is suitably secured as by soldering or welding.

The end member 36 is further provided with the flange portion 38 which extends inwardly and beyond the inside edge of the upper end of the cylindrical wall member 32 and presents an upper and outer surface adapted to be contacted by the gasket member 39 which may be suitably secured either to the flange portion 38 or to the cover member 40, the cover member 40 being provided with the extension or pilot portion 41 which locates and extends within the gasket member 39 and is also further adapted to enter and extend within the bore of the flange portion 38 of the end member 36.

The flange portion 37 of the end member 36 is provided with a plurality of ear or lug portions 42 in which is suitably mounted the pins 43 upon which is pivotally mounted the pin or stud members 44 which are adapted to be threadably engaged by the wing nuts 45 which are adapted to be pivotally moved to positions within the slots 46 which are located around the periphery of the cover member 40, thus permitting the stud members 44, together with the wing nuts 45 to be pivotally moved from engagement with the cover member 40 to permit ready removal of the cover assembly E, one of the stud member 44 and wing nuts 45 being disposed in Fig. 1 in a disengaged position relative to the cover member 40.

It is to be noted that whereas my dispensing mechanism is suitable for dispensing various kinds of liquids, beverages, and similar products, it is especially adapted for the dispensing of beer, and is herewith disclosed as being assembled in cooperation with various units as used in the dispensing of beer or similar liquors and in the dispensing of which the beer or similar liquor is forced under pressure from a keg or similar container, indicated at 47, Fig. 1, and through the upper wall portion 48 of which is suitably secured the connector member 49 which is provided with the tube or pipe 50 which conventionally extends to a point adjacent the bottom wall of the keg or container 47. The connector member 49 is of conventional construction and is suitably provided with a handle operated valve mechanism 51 which permits the beer to be shut off as desired from passage from the keg 47 out through the connector member 49.

The tank assembly F, indicated in Fig. 1 as setting on the floor adjacent the dispensing mechanism, is of conventional construction with sufficient rigid characteristics to contain gas under a pressure of substantially 1200 to 1400 pounds and is provided to force the beer from the keg 47 out through the pipe 50 and to the interior of the can or container 35 as will be more fully hereinafter described. Ordinarily the gas used will be $CO_2$. The tank assembly F is provided with a suitable handle operating cut off valve mechanism 53 which permits the pressure of the gas within the tank assembly F to be cut off from flowage to the keg 47 or to the interior of the can 35, as more fully disclosed hereinafter.

The pipe or conduit member 54 is suitably connected to the connector member 49 and to the valve member 55 which is conventionally constructed and operated by the handle member 56, the valve member 55, together with the handle member 56, thus enabling the gas from the tank assembly F to be shut off, as desired, from flowing through the pipe 54 to the keg 47, and at the same time allowing the gas from the tank assembly F to flow through the connector member 57 and through the pipe or conduit member 58 to the interior of the can or container member 35, as more fully disclosed hereinafter.

The pressure gage 59 is suitably connected between the valve member 55 and the connector member 57 and is provided with the gauge recording portion 60 to permit the pressure of the gas within the tank assembly F flowing through the pipes 54 and 58 to be readily observed at all times except when the handle operated valve mechanism 53 is in its closed position for preventing the gas in the tank assembly F from flowing through the connector member 57.

The pressure of the tank assembly F is controlled to flow through the connector member 49 and the pipe 50 into the keg 47 and then the high pressure of the gas within the keg 47 will cause the beer to flow up through the pipe 50 and the connection member 49 and through the pipe or conduit member 61 which extends through the opening 62 in one of the side wall members 23 to a point where it connects with the connection member 63 located within the interior of the base assembly D and suitably secured to the lower wall portion 15 of the can member 14. The connection member 63 is suitably connected with the connection member 64 located within the interior of the can member 13, which in turn is suitably connected with the pipe or conduit member 65.

It is also to be noted that the connection members 63 and 64 will provide a passage for the beer through said connection members 63 and 64 and also through the spacer member 65A which is suitably located between the wall portions 12 and 15 and further forms a spacing member therebetween.

It is now to be noted that the pipe or conduit member 65 which has a straight portion connected with the connection member 64 is bent or formed to provide a plurality of helical coils 66 which start at the upper portion of the receptacle assembly A and helically progresses downwardly around and concentrically with the cam member 35, the helical coils 66 being positioned with a space between their inner sides and the outside of the can or receptacle member 35 as disclosed.

The lower end of the helical coils 66 is extended and provided with the straight pipe or conduit portion 67 which extends upwardly between the outside of the helical coils 66 and the inner wall portion 1 of the receptacle assembly B and is connected with the connector member 68 which is suitably secured to the elbow or connection member 69 which is provided with the threaded portion 70 which engages the threaded extension portion 71 of the housing 72 which thus extends through the threaded opening 73 of the cover member 40 to position and secure the connection member 69 and the housing 72 in a supported position upon the cover member 40, the housing 72 being provided with the passage 73A which connects with the passage 74 of the connection member 69 and thus with the straight pipe portion 67 and the helical coils 66.

The housing 72 is provided with the chamber or passage 76, the outer end of which is threaded as at 77 for engagement with the extension portion 78 of the plug member 79.

The plug member 79 is adapted to be engaged by the threaded end of the sleeve 80 which is thus threadably secured therein, the sleeve 80 being provided with the bore 81, together with the slots 82 through its side walls, the slots 82 extending to a point adjacent but not through the lower end wall of the sleeve member 80.

The plug member 79 is also provided with the bore 83. The valve member 84 is provided with the stem or shaft portion 85 which is slidably mounted in the bore 83 of the plug member 79 and in the bore 81 of the sleeve member 80.

The valve member 84 is provided with the head portion 86 which is suitably secured to the stem portion 85 and is provided with the recess 87 in which is suitably secured the valve seat member 88 which is constructed of resilient material such as rubber or similar material, the valve seat member 88 being constructed of sufficient size so that when forced into the recess 87 it will be secured by its press or resilient fit therewith.

Also if desired the upper end of the head portion 86 may be suitably upset to further secure the valve seat member 88 therein.

The housing 72 is provided with the valve seat surface 89 extending around the lower end of the passage 73A and is preferably constructed with conical outer surfaces to provide a relatively small area of contact between the valve seat surface 89 and the upper surface of the valve seat member 88. The head portion 84 together with the valve seat member 88 thus tends to movably operate in the recess 76 of the housing 72.

The housing 72 is provided with a threaded hole 91 for threadably engaging the screw end 92 of the stud 93 which is provided with the slot 94 extending therethrough, together with the pin 95 which is suitably secured in the stud 93 and extends through the slot 94.

The float member 96 is conventionally provided with a hollow construction which enables it to float in a partially submerged position at the upper surface of the beer within the can member 35, the upper surface of the beer contents being indicated at 97 in Fig. 2 when the valve member 84 is in its closed position, the upper surface of the beer contents within the can member 35 being indicated at 98 in Fig. 4 when the valve member 84 is in its open position.

The float member 96 is disclosed as extending partially within the beer contents of the can or receptacle member 35.

It is to be noted that the float member 96 will be provided with the lever arm 99 which is secured to the float member 96 by the connection member 100, the lever arm 99 extending through the slots 82 in the side wall portions of the sleeve member 80 and being pivotally mounted on the pin 95 supported in the stud 93, the upper surface of the lever arm 99 thus extending through the bore 81 of the sleeve member 80 and contacting the rounded or cam end 101 of the stem portion 85 of the valve member 84.

It is thus to be noted that when the float member 96 is moved upwardly from its position as disclosed in Fig. 4 by the flow of beer into the interior of the container 35, the valve member 84 will be actuated by the lever arm 99 to a closed position, resulting from the valve seat member 88 being compressed against the valve seat portion 89 of the housing 72 by the upward thrust of the float member 96 as actuated by the rising level of the beer contents within the container member 35 as the beer is forced under pressure into the interior of the can member 35.

Also it will be noted that as the beer is withdrawn from the interior of the can member 35, as is more fully hereinafter disclosed, the float member will fall or move lower according to the lowering of the upper surface of the beer contents so that the lever arm 99 will move to its lower position as disclosed in Fig. 4 and thus allow the valve member 85 to fall by the force of gravity to its open position as disclosed in Fig. 4 and which permits the beer to flow through the passage 73 and through the recess or chamber 76 into and through the passage 102 of the spout or extension conduit 103 which is suitably secured to the housing member 72 so that its passage 102 is connected with the chamber 76, the spout or extension conduit 103 being formed so that it extends downwardly and outwardly from the housing member 72 and is provided with an end portion having the surface 104 which is located adjacent the inner surface 105 of the cylindrical member 32 of the container member 35 with a relatively narrow or negligible space 106 therebetween.

It is to be especially noted that when the beer issues from the passage 102 of the spout or extension member 103 that it will not splash and consequently will eliminate the development of any foam or foaming characteristics due to the relatively small space 106 existing within the surface 104 at the extreme outlet of the spout 103 and the inside wall 105 of the cylindrical member 32 of the can member 35.

It is to be noted now that the pipe or conduit 58 is extended to pass through suitable openings 107 in one of the corner brackets 17 and one of the wall members 23 to allow the pipe or conduit member to extend within the interior member of the base assembly D and to be suitably connected to the connector member 108, which is further suitably connected to the connector member 109 in the interior of the can or container member 13, the connector members 108 and 109 being suitably connected to provide passage therethrough and also through the member 110 which may be utilized for further spacing of the wall portions 12 and 15 of the can or container members 12 or 13, the connector members 108 and 109 thus forming a passage through themselves and through the member 110 for connecting the pipe or conduit member 58 with the pipe or conduit member 111 which extends upwardly within the container member 13 and is bent or formed with the portion 112 extending substantially in a horizontal plane and which is connected by the connector member 113 to the elbow or connector member 114 which threadably engages the cover member 49 and is provided with the passage 115 which connects with the passage within the portion 112 and the pipe or conduit members 111 and 58.

It is thus to be noted that the gas under high pressure in the tank assembly F may flow not only through the gauge member 59 but also through the pipe or conduit 58 through the passage 115 of the connector member 114 and also through the threaded passage 116 of the connector member 114 to the interior of the can or container member 35, the passage of said gas being obstructed by the threaded portion 117 of the screw 118 to provide control characteristics by the manipulation of the screw 118, the threads of the extension portion 117 of the screw 118 and the threaded passage 116 of the connector member 114 being formed with sufficient clearance space therebetween to provide for the passage of the high pressure gas between the engaging surfaces of the threaded portions, the threaded portion of the screw 118 being capable of being threadably moved to a position in close contact or relatively close contact with the inner end of the connection member 114 to establish proper graduated control of the flowage of the gas therethrough and consequently to control the pressure of the gas from the tank assembly F to the interior of the container 35 in such a manner that the pressure of the gas within the container or can member 35 may be held to a predetermined or desired amount, which in my invention is thus controlled, to flow from the tank assembly F and to maintain approximately two pounds of pressure within the interior of the container 35, this pressure being sufficient to maintain the beer contents under pressure within the container member 35 and to force it therefrom through the passage 119 of the connector member 120 and through the pipe or conduit 121 and through the faucet 122 and out of the nozzle 123 into the glass 124 or similar receptacle into which the beer is to be dispensed.

The member 33 will be provided with the boss portion 125 to which the connector member 120 may be threadably secured, the pipe or conduit member 121 being secured to the connector member 120 by the connector member 126 and to the connector member 127 by the connector member 128, the connector member 127 being suitably mounted in and extending through the inner and outer wall portions 1 and 2 of the receptacle assembly B and through the member 129 which may be utilized as a spacer member between the inner and outer wall portions 1 and 2.

The faucet member 122 will be suitably provided with valve or shut off mechanism provided with the handle member 130 which thus controls the flow of the beer contents from the container member 35 and out through the spout 123 into the glass 124.

The gauge member 131 is suitably installed in the cover member 40 and is provided with a suitable passage connecting with the interior of the container member 35 so that the controlled pressure of the gas within the interior of the container member 35 may be registered and readily observed thereon.

It is to be understood that crushed or broken ice will be packed around the helical coil 66 and thus around the receptacle assembly A and within the receptacle assembly B, said ice being indicated at 132 on one side of the sectional Figure 1.

In order to eliminate injury due to excessive pressure within the can member 35 I employ the safety valve assembly G which is provided with the housing member 133 which is provided with the threaded extension 134 which threadably engages the opening 135 in the cover member 40 and extends into the interior of the can member 35.

The housing member 133 is provided with the passage 136 which connects with the enlarged passage 137 around the end of which extends the raised valve seat surface 138 which is adapted to be engaged by the valve seat member 139 which is constructed of resilient material such as rubber or similar material and is adapted to be compressed and retained within the bore or chamber 140 of the valve or retainer member 141, the valve seat member 139 being further retained by the stud 142 which is provided with the extension or stud portion 143 which threadably engages the threaded hole 144 in the valve member 141.

The stud member 142 is provided with the extension portion 145 which is provided with the slots or grooves 146 which extend longitudinally of the extension portion 145 and permit the passage of the gas therebetween under certain conditions, as hereinafter described. The stud 142 is provided with a suitable shoulder portion for exerting a clamping effect on the valve member 139 to further support it in its operative position in the valve member 141.

The retainer member 141 is provided with the shouldered portion 147 which extends within and thus supports and locates the spring or resilient member 148 which is further supported and located by the shoulder portion 149 of the retainer member 150 which is adapted to move longitudinally within the bore, chamber or recess 151 of the housing 152, which threadably engages and is removably mounted on the threaded portion 153 of the housing member 133.

The housing member 133 is provided with the flange portion 154 which is preferably of hexagonal or similar polygonal shape to permit the housing 133 to be securely assembled in position on the cover member 40.

The housing member 152 is provided with the threaded hole 155 which is threadably engaged by the screw 156 which extends into the chamber 151 and engages the end surface of the retainer member 150, thus permitting the retainer member 150 to be actuated in one direction longitudinally within the chamber 151 by the screw 156 to permit the retainer member 150 to be actuated by the spring 148 in an opposite direction longitudinally in the chamber 151 when the screw 156 is threadably moved out of the housing member 152, thus providing means for adjusting the tension of the spring 148 and thus the pressure with which the valve seat member 139 engages the valve seat surface 138. The housing member 152 is provided with the threaded extension 157 which is adapted to be engaged by and support the cap member 158 which extends around and encloses the screw 156, thus protecting the adjusting mechanism and yet providing ready access thereto.

The housing member 152 is also provided with the holes or openings 193 which connect the chamber 151 with the outside atmosphere.

The extension portion 134 of the housing member 133 is provided with the bore or recess 159 in which is mounted the screen member 160 which extends across the opening at the lower end of the passage 136, the screen member 160 being preferably of fine mesh to prevent the beer contents within the can member 35 from splashing up into and through the safety valve assembly G, the screen member 160 being suitably retained by soldering as at 161, or by similar means. The helical coils 66 may be positioned and located one from another, according to the pitch of the helical coils 66, by a plurality of support mechanisms 162 which may be secured to the helical coils 66 preferably at their inner sides as by soldering, welding or similar means, the support members 162 being provided with a series of flange portions 163 at their lower ends through which extend the screws 164 engaging the wall portions 12 of the can member 13.

The connector member 165, which is disclosed in detail in Figs. 11 and 12, is suitably provided with an extension portion 166 which is threadably connected respectively with the nut member 167 and connector member 57, the connector member 165 being further provided with the extension portions 168 which are provided with the pipe threads 169 for connecting respectively with one end of the pipe or conduit member 54 and the pipe or conduit 58 by means of the nuts 170. The connection members 165 are each further provided with the threaded recess or opening 171 which are adapted to be engaged by an adjusting screw 118, as disclosed in connection with the connector member 114 in Fig. 2, thus providing means for further gauging and setting the control of the pressure of the gas as it enters the pipe or conduit member 58 or to the pipe or conduit member 54 as hereinbefore disclosed.

The can member 13 is provided with the depressed portion 172 in the wall portion 12, together with the extension portion 173 which extends through the depressed portion 172 of the wall portion 12 and also through the wall portion 15 of the can member 14, and is engaged by the nut or connector 174 to which is suitably connected the drain pipe 175 which may extend through the base assembly D and through the table member 16. The member 176 may be interposed between the depressed portion 172 of the wall portion 15 and act as a spacer member therebetween. Also the gasket 177 may be interposed between the wall portion 15 and the nut 174.

It is to be noted that the drain pipe 175 will now be connected with the interior of the can member 13 and will provide for any accumulation of water in the can member 13, as a result of the melting of the ice 132, being drained out through the drain pipe 175 and the control of the drainage of said water or ice is provided by the overflow or tubular member 178 which is threaded into the hole or opening 179 of the extension portion 173 which extends to a point substantially adjacent the cover assembly E of the receptacle assembly A, the upper end of the overflow or tubular member 178 being provided with the enlarged end 180 which is thus positioned for ready access throughout the upper and open end of the receptacle assembly B when the cover assembly C is removed, the enlarged end 180 being suitably formed to be used as a handle member, or it may be formed with a hexagonal or similar polygonal shape to receive a wrench member when it is desired to remove the overflow or tubular member 178 and allow the water or melted ice to flow out through the passage 179 and the drain pipe 175.

The bracket or housing member 181 is constructed with a suitable shape to fit adjacent the outer surface of the receptacle assembly B and is preferably provided with a curved or receding surface at its outer side as disclosed in Fig. 1 and also with a semi-circular shape as disclosed in its plan view in Fig. 16, the bracket or housing member 181 being provided with the chamber or recess 182 which is adapted to receive and contain any surplus beer or liquid which may be spilled while being dispensed into the glass or similar receptacle 124, the upper end of the chamber or recess 182 being substantially closed by the removable member 183 which is provided with the depresed wall portion 184, together with the flange 185 which extends around and over the upper edge surface of the housing or bracket 181, the depressed portion 184 being provided with a series of drain holes 186 through which any accumulation of beer or similar liquid in the depressed portion 184 may flow into the recess or chamber 182 and may accumulate there until it is desired to empty the bracket or housing 181. The bracket or housing 181 is provided with the flange 187 which may be provided with the openings 188 which are adapted to be engaged by the rivets 189 which are suitably mounted in the outer wall portion 2 of the receptacle assembly B.

The openings 188 are provided with the enlarged portions 190 which are of sufficient size to permit the head of the rivets 189 on the bracket or housing 181 to pass therethrough when the bracket or housing 181 is raised upwardly off of the rivets 189, thus providing for ready removal of the bracket or housing 181 to permit the accumulation of beer of similar liquid therein to be poured or drained therefrom, the upper level of which is indicated at 191. To facilitate the pouring out of the accumulated beer or liquid in the bracket or housing 181, the depressed wall portion may be further provided with the larger hole 192 which may be located adjacent the outer edge of the bracket or housing 181, thus facilitating the ready running out of the liquid from the chamber or recess 182 of the bracket or housing 181.

In operation the receptacle assembly B is located on a table or suitable supporting structure as disclosed, and the receptacle assembly A is placed and located therein and is then connected to the faucet 122 as hereinbefore described to provide for the exit or discharge of the beer or similar liquor or liquid to be dispensed, the pipe or conduit 61 being connected to the keg or similar container 47 for containing the beer, liquid or liquor to be dispensed, the keg 47 being connected through the connector member 49 together with the pipe or conduit 54 with the tank assembly F which contains the source of high pressure gas, the tank assembly F which contains the source of high pressure gas being further connected by means of the pipe or conduits 58, 111, and their operatively connected connector members, with the interior of the receptacle assembly A to provide means whereby the pressure of gas within the tank assembly F may flow into the interior of the receptacle assembly A.

The pressure of gas within the tank assembly F will force the beer or similar liquid or liquor from the keg 47 into the receptacle assembly A until it reaches the level indicated by the numeral 97 in Fig. 2 at which level the float member 96 will be actuated upwardly to move the valve member 84 to its closed position, which thus shuts off further inflow of beer to the interior of the tank assembly A.

The gas under high pressure from the tank assembly F will fill the interior portion of the receptacle assembly A and as soon as the lever member 130 of the faucet 122 is operated to its open position the pressure of the gas above the beer in the receptacle assembly A will force the beer out through the pipe or conduit member 121 and its operatively connected connector members and through the faucet 122 into the glass 124.

The exit of the beer from the receptacle assembly A tends to lower the level of the beer from the line 97 in Fig. 2 to the line 98 which indicates the level of the beer after a portion of the beer has been withdrawn from the receptacle assembly A and which allows the float member 96 to move downwardly, thus allowing the valve member 84 to be actuated by gravity downwardly to an open position, which will allow further beer from the keg 47 to be forced into the receptacle assembly A to raise the float member 96 to a position in which it will actuate the valve member 84 to its closed position again.

The presence of the gas under pressure from its source of supply in the tank assembly F will provide for an intimate mixing of the gas with the beer in the receptacle assembly A so that the beer will always be maintained by the gas under pressure and to have the proper amount of effervescence to maintain its flavor and prevent it from becoming stale or flat.

Any excess pressure of the gas within the receptacle assembly A above the surface of the beer therein will be permitted to escape by raising the valve seat member 139, together with its retainer member 141 against the pressure of the spring 148 which will allow said excess gas to pass through the screen 160 and the passage 136 and out between the valve seat member 139 and the valve seat surface 138 into the chamber 131 of the housing 32 and from thence outwardly through the openings 193 in the side walls of the housing 152 to the outside atmosphere, the valve member 139 being urged by the spring 148 to its valve closing position when the pressure has again reached the predetermined or controlling pressure within the receptacle assembly A.

If any of the beer is slopped or spilled over the edge of the glass 124 it will be caught or deposited in the depressed portion 184 and conducted through the openings 186 and 192 into the chamber 182 of the bracket or housing 181 and when such accumulation of beer occurs within the chamber 182, the bracket or housing 181 may be lifted upwardly from the rivets 189 until the heads of said rivets 189 are positioned properly within the enlarged openings 190 and from which position the bracket or housing 181 may be entirely removed from its supporting position on the outside of the receptacle assembly B, thus allowing the accumulation of the beer within the chamber 182 to be poured therefrom through the opening 192 as the bracket or housing 181 is positioned or tilted to the required position in which the beer will flow from the chamber 182 through the hole or opening 192.

As the ice 132 melts and water accumulates within the can member 13, the cover assembly C may be removed and by turning the overflow or tubular member 178, the overflow or tubular member 178 may be removed from its position within the passage 179, thus allowing any accumulation of melted ice or water to flow out through the passage 179 and the drain pipe 175.

I claim:

1. In a dispensing mechanism connected with a keg of beer together with a tank of gas under pressure and adapted to contact the beer, the combination of a container member provided with insulated walls and adapted to contain ice, a base mechanism supporting said container, a receptacle assembly mounted within said container and surrounded by helical coils adapted to be contacted by the ice in said container, said helical coils being connected with said keg of beer and said receptacle assembly to form a conduit for the passage of the beer from said keg to the interior of said receptacle assembly, said conduit extending through said base mechanism, conduit mechanism connecting said tank of gas and the interior of said receptacle assembly, a faucet mechanism mounted in and extending through the wall portions of said container member, conduit means connecting said faucet mechanism with said receptacle assembly, valve mechanism limiting the flow of the beer to the interior of said receptacle assembly, float mechanism suitably mounted for engaging the beer in said receptacle mechanism and actuating said valve mechanism, conduit means for discharging the beer from said valve mechanism, against the inside wall surface of said receptacle mechanism, said conduit means having its discharge end located in close proximity to the inside wall surface of said receptacle assembly, and a safety valve mechanism connected with the interior of said receptacle mechanism and permitting any excess pressure of gas to escape to the outside atmosphere and controlling the pressure of the gas in said receptacle assembly to a predetermined maximum pressure.

2. In a dispensing mechanism connected with a source of liquid to be dispensed together with a source of gas under pressure for forcing the liquid out of the dispensing mechanism, the combination of a receptacle, a valve mechanism for controlling the flow of the liquid into said receptacle and provided with a housing, a float mechanism actuated by the liquid in said receptacle and further actuating said valve mechanism, a discharge conduit supported by the housing of said valve mechanism for guiding the liquid flowing into said receptacle to be discharged against and in close proximity to the inside wall surface of said receptacle to eliminate foaming of the liquid, the end of said discharge conduit being separated from said inside wall surface by a relatively narrow space of substantially constant width throughout its total area, and means for maintaining the gas in said receptacle at a predetermined pressure.

3. In a dispensing mechanism connected with a source of liquid to be dispensed, the combination of a receptacle, means for forcing the liquid into said receptacle, a float mechanism for limiting the liquid in said receptacle to a predetermined maximum level and means for guiding the liquid, as it enters said receptacle, to strike the inner wall surface of said receptacle above said maximum level, the discharge outlet of said means having an end surface extending circumferentially of the receptacle wall in close proximity to said inner wall portion to prevent foaming and frothing of said liquid, said end surface of said means being separated from said inner wall portion with a relatively narrow space of substantially constant width throughout.

4. In a dispensing mechanism, the combination of a receptacle for receiving a liquid to be dispensed, means for limiting the liquid in said receptacle to a predetermined maximum level, and a conduit for discharging liquid into said receptacle above said maximum level, said conduit having its end surface located adjacent a surface of said receptacle and with a relatively narrow space therebetween to prevent said liquid from foaming, said relatively narrow space being substantially of constant width throughout its total area.

5. In a dispensing mechanism for dispensing beer, the combination of a receptacle, means for forcing beer into and through said receptacle, means for maintaining the beer in said receptacle between predetermined maximum and minimum levels, and means for preventing splashing and foaming of said beer as it passes into said receptacle, said means comprising a tubular conduit of substantially equal area throughout and having an end surface extending substantially circumferentially of the receptacle wall to define a narrow space of equal width between said end surface and said receptacle wall above said maximum level.

6. In a dispensing mechanism for beer, the combination of a plurality of brackets comprising top and base flanges, a receptacle mounted on the top flanges of said brackets, and adapted to contain ice, wall members secured to the sides of said brackets, a door member pivotally mounted adjacent the sides of a portion of said brackets, a second receptacle mounted within said first mentioned receptacle, conduit means connecting a source of beer supply and said second receptacle and comprising helical coils extending around said second receptacle, faucet means suitably mounted and connected with said conduit means, a tank of gas under pressure, and conduit means connecting said tank of gas with said source of beer supply and said second receptacle.

7. In a dispensing device of the type described, in combination, a beer receptacle, a beer-cooling coil surrounding and entering said receptacle, means for icing said coil and said receptacle, valved means conveying gas under pressure to said receptacle, a float valve mechanism limiting flow of beer from said coil to said receptacle and maintaining the beer in said receptacle between predetermined maximum and minimum levels, and means directing flow from said valve mechanism around the inner wall of said receptacle above said maximum level.

8. In a dispensing device of the type described, in combination, a beer receptacle, a beer-cooling coil surrounding and entering said receptacle, means for icing said coil and said receptacle, valved means conveying gas under pressure to said receptacle, a float valve limiting flow of beer from said coil to said receptacle and maintaining a predetermined liquid level therein, and means directing flow from said valve mechanism around the inner wall of said receptacle above the liquid level.

9. In a dispensing device of the type described, in combination, a beer receptacle, a beer-cooling coil entering the upper part of said receptacle, a float valve mechanism limiting flow of beer from said coil to said receptacle and maintaining a predetermined liquid level in said receptacle, means directing flow from said valve mechanism against the inner wall of said receptacle above the liquid level, and icing means extending above the said liquid level and cooling the wall against which the in-coming flow of beer is directed.

10. In a dispensing device of the type described, in combination, a beer receptacle, a beer-cooling coil entering the upper part of said receptacle, a float valve mechanism limiting flow of beer from said coil to said receptacle and maintaining a predetermined liquid level in said receptacle, means directing flow from said valve mechanism radially around the inner wall of said receptacle above the liquid level, and icing means extending above the said liquid level and cooling the wall against which the in-coming flow of beer is directed.

PAUL HART.